United States Patent
Inui

[11] 3,944,254
[45] Mar. 16, 1976

[54] SHOCK-ABSORBING DEVICE

[76] Inventor: Takao Inui, No. 2-20, I-cho Koryo-nishi, Sakai Osaka, Japan

[22] Filed: Oct. 25, 1974

[21] Appl. No.: 518,062

[52] U.S. Cl. .............................................. 280/276
[51] Int. Cl.² ........................................ B62K 21/20
[58] Field of Search ........................... 280/276, 277

[56] References Cited
UNITED STATES PATENTS

| 1,206,210 | 11/1916 | Culley | 280/276 |
| 2,188,968 | 2/1940 | Uber | 280/276 |
| 2,298,494 | 10/1942 | Manton | 280/276 |
| 2,550,876 | 5/1951 | Spencer | 280/276 |

FOREIGN PATENTS OR APPLICATIONS

| 842,561 | 6/1939 | France | 280/276 |
| 23,575 | 11/1901 | United Kingdom | 280/276 |
| 580,257 | 11/1924 | France | 280/276 |
| 111,233 | 11/1917 | United Kingdom | 280/276 |
| 499 | 6/1907 | United Kingdom | 280/276 |
| 935,049 | 10/1955 | Germany | 280/276 |

*Primary Examiner*—M. H. Wood, Jr.
*Assistant Examiner*—Terrance L. Siemens
*Attorney, Agent, or Firm*—George B. Oujevolk

[57] ABSTRACT

A shock-absorbing device for a bicycle and the like. This device comprises a front fork divided in two shafts that connect at the upper terminal thereof to the handle shaft via a fitting unit and at their lower terminal sustain the front wheel of said vehicle, said front fork being swingable back and forth centering around the foregoing upper juncture. Said front fork is intermediately sandwiched by a pair of springs in the state that the springs press the fork in opposite directions so as to absorb either horizontal or vertical shocks thereby providing safety to the rider to some extent at the time of collision and the like or comfort when riding on a bumpy road.

2 Claims, 4 Drawing Figures

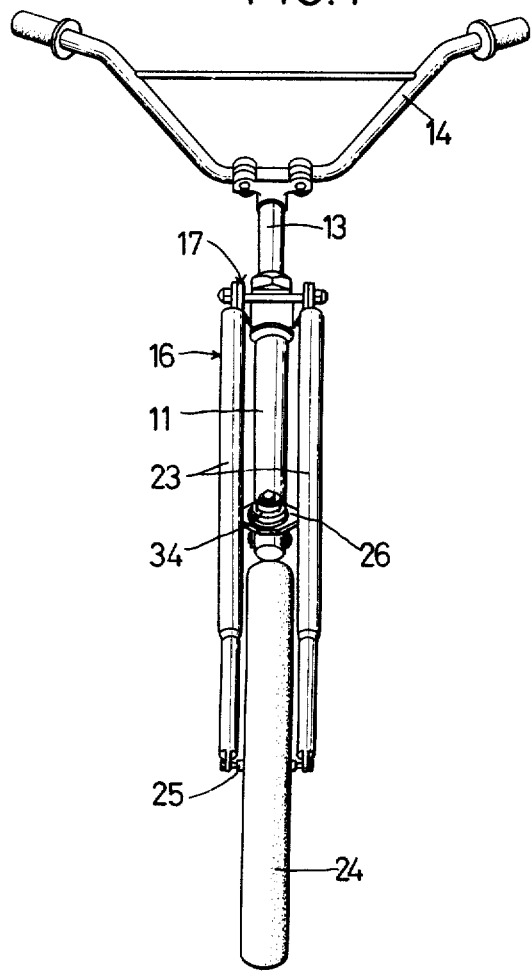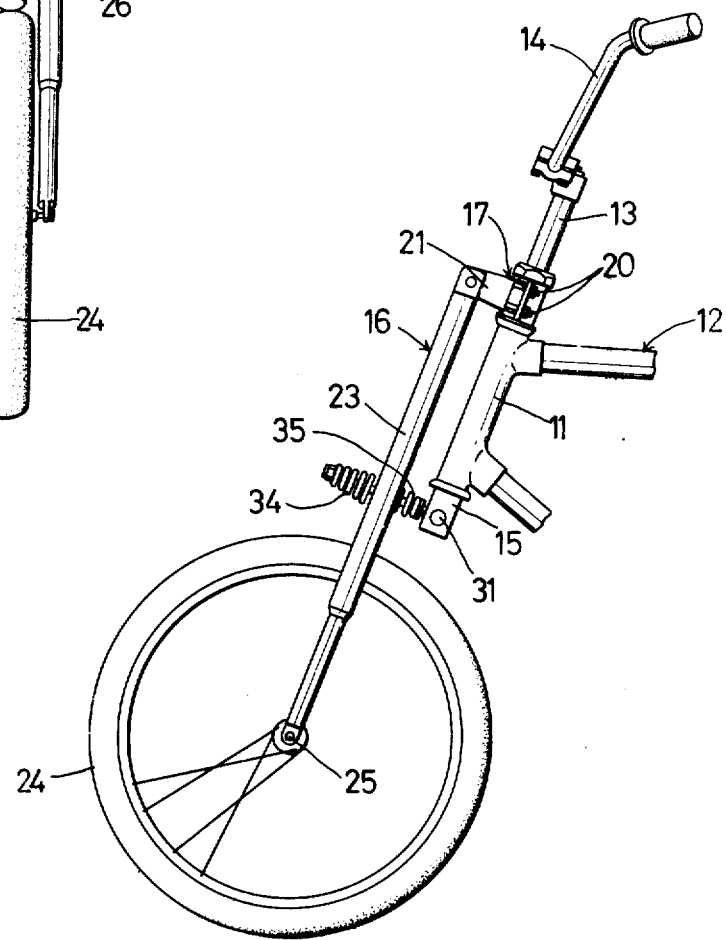

SHOCK-ABSORBING DEVICE

The present invention relates to a shock-absorbing device for a bicycle and the like, and in particular a shock-absorbing device to absorb shock on the vehicle at the front under the bouncing effect of springs attached thereto.

Needless to say, the rider of a conventional bicycle or the like has had no way to escape from shocks either accidental or caused on bumpy roads.

A first object of this invention is to provide a shock-absorbing device for a bicycle and the like to secure the rider either as to safety in a collision and the like and assure comfort in riding on a rugged road.

A second object of this invention is to provide a shock-absorbing device available in a simple mechanism.

The invention as well as other objects and advantages thereof will be more readily understood from the following detailed description when taken together with the accompanying drawings, in which:

FIG. 1 is the front view of a bicycle equipped with the device contemplated herein.

FIG. 2 is a side view of the device at the front thereof.

Figure 3:
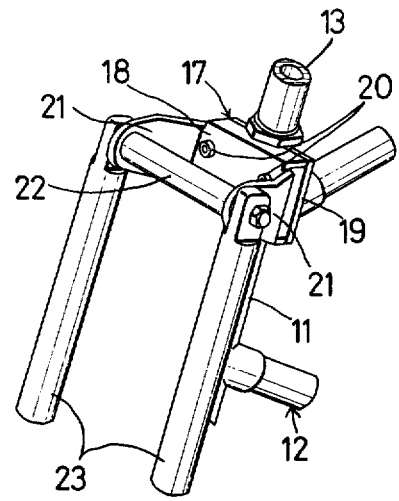
FIG. 3 is a perspective view of this device at the upper part thereof.

In the embodiment shown in the foregoing figures, there is a head arbor 11 connecting to the main axis 12 of a bicycle equipped with the device herein contemplated. The head arbor 11 sustains a handle shaft 13 rotatably therethrough, said handle shaft 13 at its upper terminal being mounted with a bar handle 14 and forming a diametrically enlarged portion 15 at its lower terminal portion extending out of the head arbor 11.

Intermediately on the handle shaft 13 just above the upper terminal of head arbor 11 is a fitting unit 17 for fitting a front fork 16 thereto.

Fitting unit 17 consists of a front plate 18 and a back plate 19, a pair of bolts 20 firmly connecting plates 18 and 19 to each other in the state that said plates 18 and 19 sandwich the handle shaft 13, a pair of supporting piece 21 being provided on each side of front plate 18 so as to project forward therefrom, and a spindle 22 being sustained at both ends thereof by the confronting supporting piece 21 in front of said front plate 18, in the above construction the fitting unit 17 can rotate together with handle shaft 13.

The afore-mentioned front fork 16 comprises a pair of pipe 23 disposed side by side in front of handle shaft 13, pipes 23 at each of their upper terminal portions being connected to spindle 22 at each of the end portions thereby enabling said front fork 16 to move back and forth centering around said spindle 22.

The front fork 16, extends further downward from the lower terminal of said head arbor 11, and sustains at the lower end thereof the wheel shaft 25 of the front wheel 24 so as to make it rotatable at the sustaining portion, needless to say.

Figure 4:
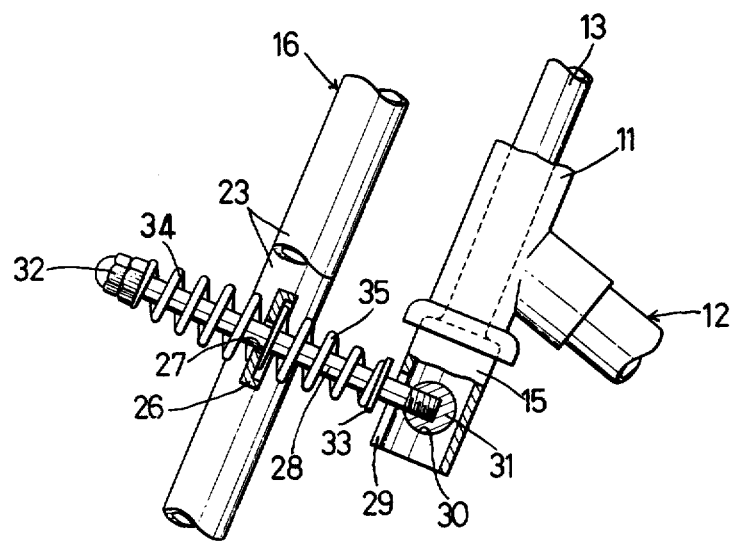
FIG. 4 is a magnified longitudinal side section of this invention device at its lower constitution.

Intermediately on said front fork 16 at a position above front wheel 24 is a spring holder 26 which is fixed at both ends to pipes 23 by means of welding, as shown in FIG. 4.

The spring holder 26 forms at its central portion a penetration hole 27 through which a spring supporting shaft 28 penetrates. Said spring supporting shaft 28 at its rear terminal penetrates through a notch groove 29 formed in front of the afore-mentioned diametrically magnified portion 15, said shaft 28 further extending toward the handle shaft 13 thereby abutting at the rear terminal thereof against the diametrically enlarged portion 15 of the handle shaft 13.

Within the diametrically magnified portion 15 is installed a side shaft 31, said side shaft 31 at both terminals thereof being rotatably sustained by a side hole 30 formed on the side of diametrically enlarged portion 15, intermediate to the side shaft 31 and being linked to the spring supporting shaft 28 at the rear terminal thereof by means of screwing and the like.

The foregoing mechanism enables the spring supporting shaft 28 to swing up and down centering around the side shaft 31 within the scope of penetration hole 27, this mechanism also enabling to swing said fork 16 back and forth at the time of a shock landing thereon.

Said spring supporting shaft 28, simultaneously with the fitting of a nut 32 thereto at the front terminal, forms at the rear terminal portion thereof a spring holder base 33 immediately out of diametrically enlarged portion 15, said spring supporting shaft 28 further being adapted with springs 34 and 35 between spring holder 26 and the nut 32 and between the spring holder 26 and the spring holder base 33, respectively.

Springs 34 and 35, have nearly equal elasticity and press the spring holder 26 in opposite directions from back and front at the central portion of said spring supporting shaft 28. In this construction fork 16 inclines backward so as to keep parallel with handle shaft 13.

Functioning of this invention device in the foregoing embodiment is illustrated below.

When the bicycle is unused, the front fork 16 under the pressing effect of springs 34 and 35 keeps lining side by side with handle shaft 13 as shown in FIG. 2.

As is apparent in the foregoing mechanism, the front fork 16 compresses the front spring 34 as a load is imparted on the vehicle. When running on a level road the front spring 34 plays the role of a cushion thereby adding to the comfort of the rider. When on a bumpy road, the front fork 16 is caused to swing back and forth centering around shaft 22 in accordance with the up-and-down movement of the front wheel 24 with the result that springs 34 and 35 absorb the vertical shocks therein.

When a head-on shock is imparted to the fork 16 caused by a collision and the like, the backward movement of said fork 16 as the result therefrom is absorbed in the back spring 35 thereby alleviate shocks caused on the rider at that time.

What is claimed is:

1. A shock absorbing arrangement for a bicycle comprising in combination:
   a. a head arbor (11) for holding a vertical handle shaft (13) having a lower enlarged portion (15) and an upper fitting unit (17);
   b. a front fork (16) including a pair of pipes (23) for a front wheel (24) and fastening pieces (21) for fastening said front fork (16) to said fitting unit (17); and,
   c. a spring holder (26) held between said pipes (23) having an aperture (27) and a spring supporting shaft (28) passing through said aperture (27), said spring supporting shaft (28) having an inner base (33) and an outer retaining nut (32) with spring means (34, 35) held on said spring supporting shaft (28), said spring supporting shaft (28) terminating in said enlarged portion (15).

2. An arrangement as claimed in claim 1, said spring means being first and second springs (34, 35).

* * * * *